United States Patent [19]

Jones et al.

[11] Patent Number: 6,118,446
[45] Date of Patent: *Sep. 12, 2000

[54] USER INTERFACE LANGUAGE TO CLASS LIBRARY COMPILER

[75] Inventors: Ben Jones; Steve Pawlish, both of Bowie, Md.

[73] Assignee: Raytheon Company, Lexington, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/757,985

[22] Filed: Nov. 27, 1996

[51] Int. Cl.$^7$ ...................................................... G06F 13/00

[52] U.S. Cl. .................................... 345/333; 717/1; 717/5

[58] Field of Search ............................ 345/333; 707/101, 707/102, 103, 104, 203; 717/1–11

[56] References Cited

U.S. PATENT DOCUMENTS

| | | | |
|---|---|---|---|
| 5,583,983 | 12/1996 | Schmitter | 395/705 |
| 5,652,884 | 7/1997 | Palevich | 395/651 |
| 5,740,444 | 4/1998 | Frid-Nielsen | 395/705 |
| 5,793,368 | 8/1998 | Beer | 345/334 |

*Primary Examiner*—Ba Huynh
*Attorney, Agent, or Firm*—Baker Botts L.L.P.

[57] ABSTRACT

A computer implemented method that allows C++ classes based on any particular class library to be generated from a standard User Interface Language (UIL) file generated by a variety of GUI builders. A programmer can then use these classes in a familiar manner rather than being forced to use the program framework favored by any particular GUI builder. The GUI builder may then be used as a tool to facilitate the creation of classes that are inherently graphical while leaving the programmer free to deal with the inherently non-graphical bulk of the program.

9 Claims, 3 Drawing Sheets

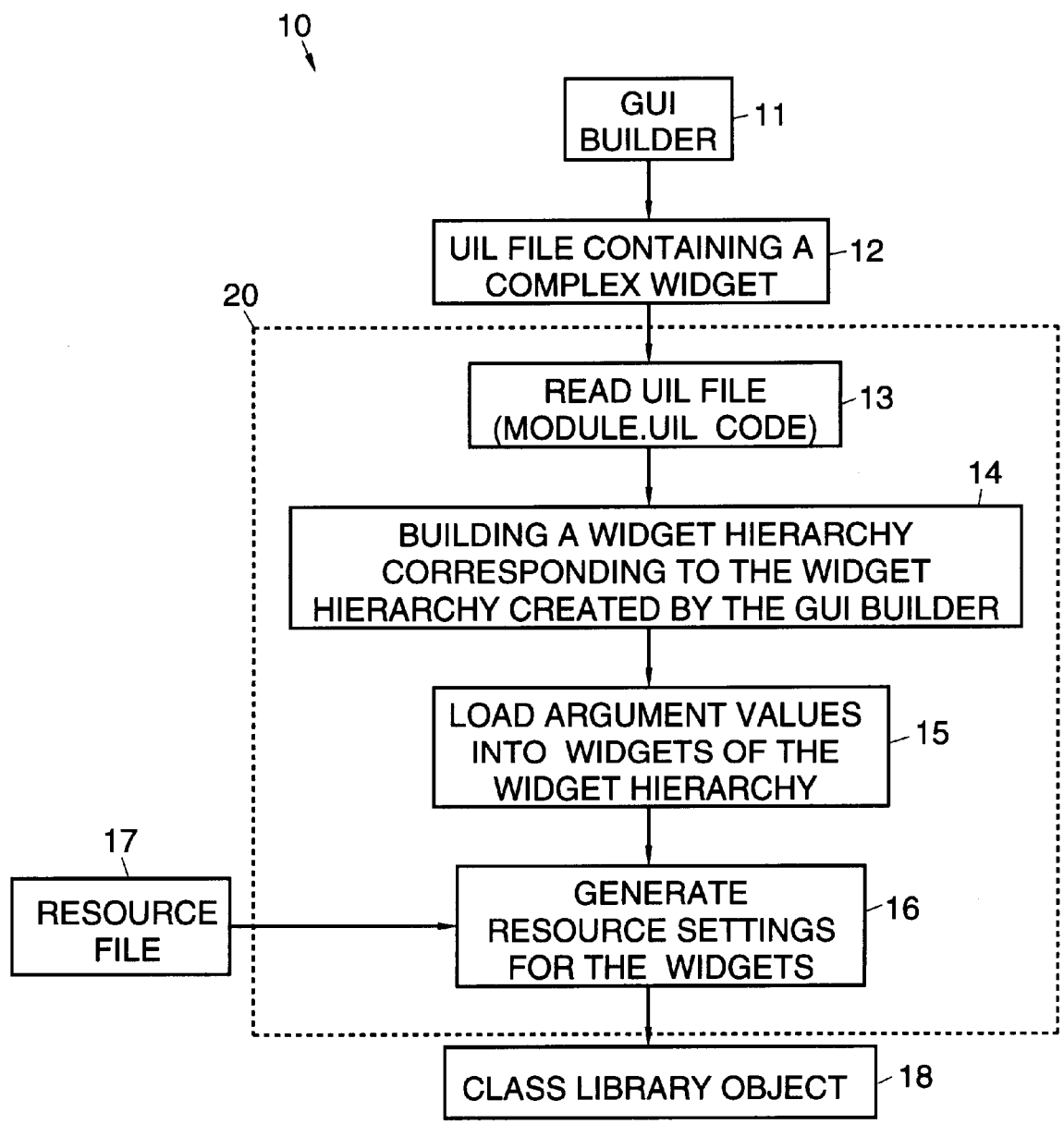

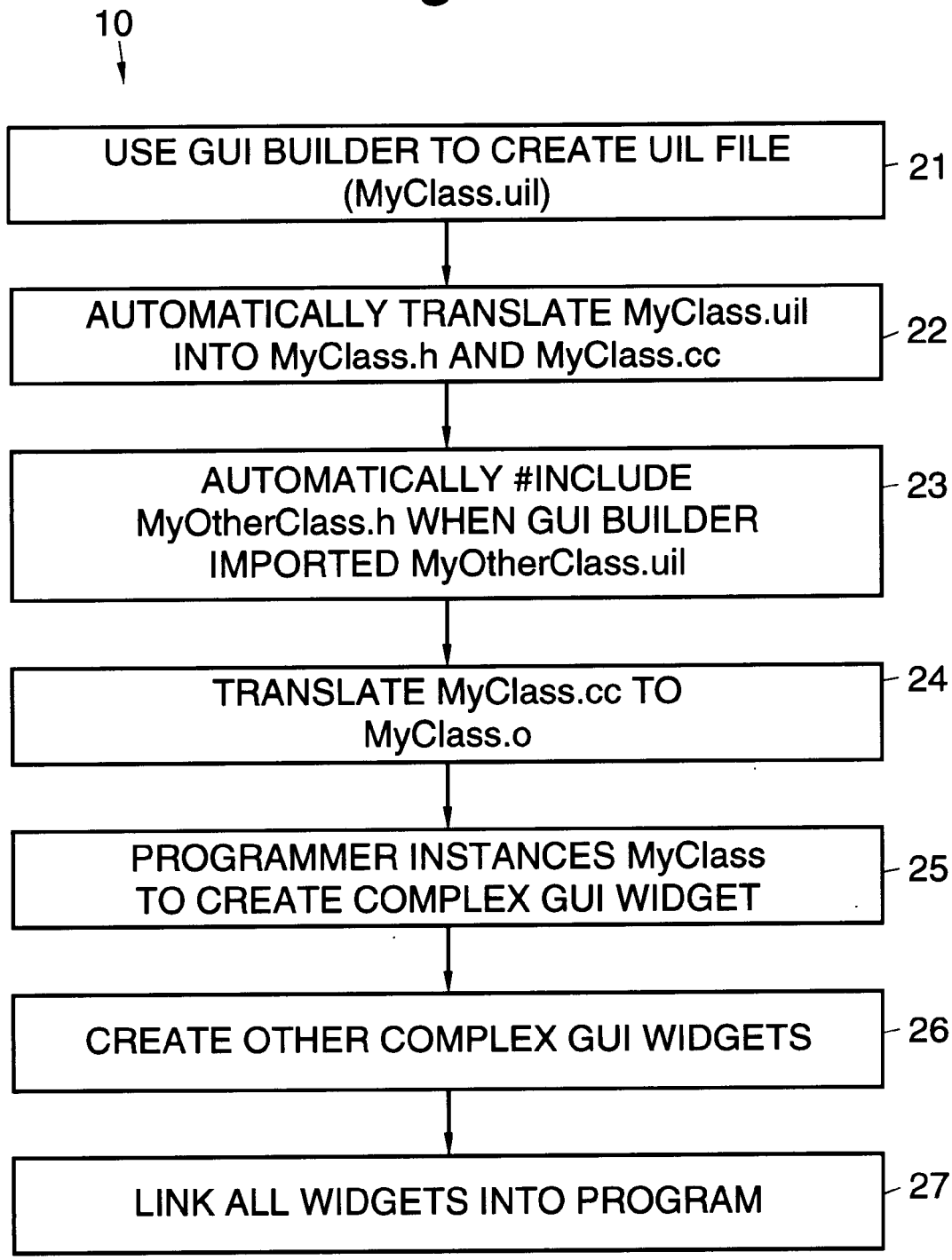

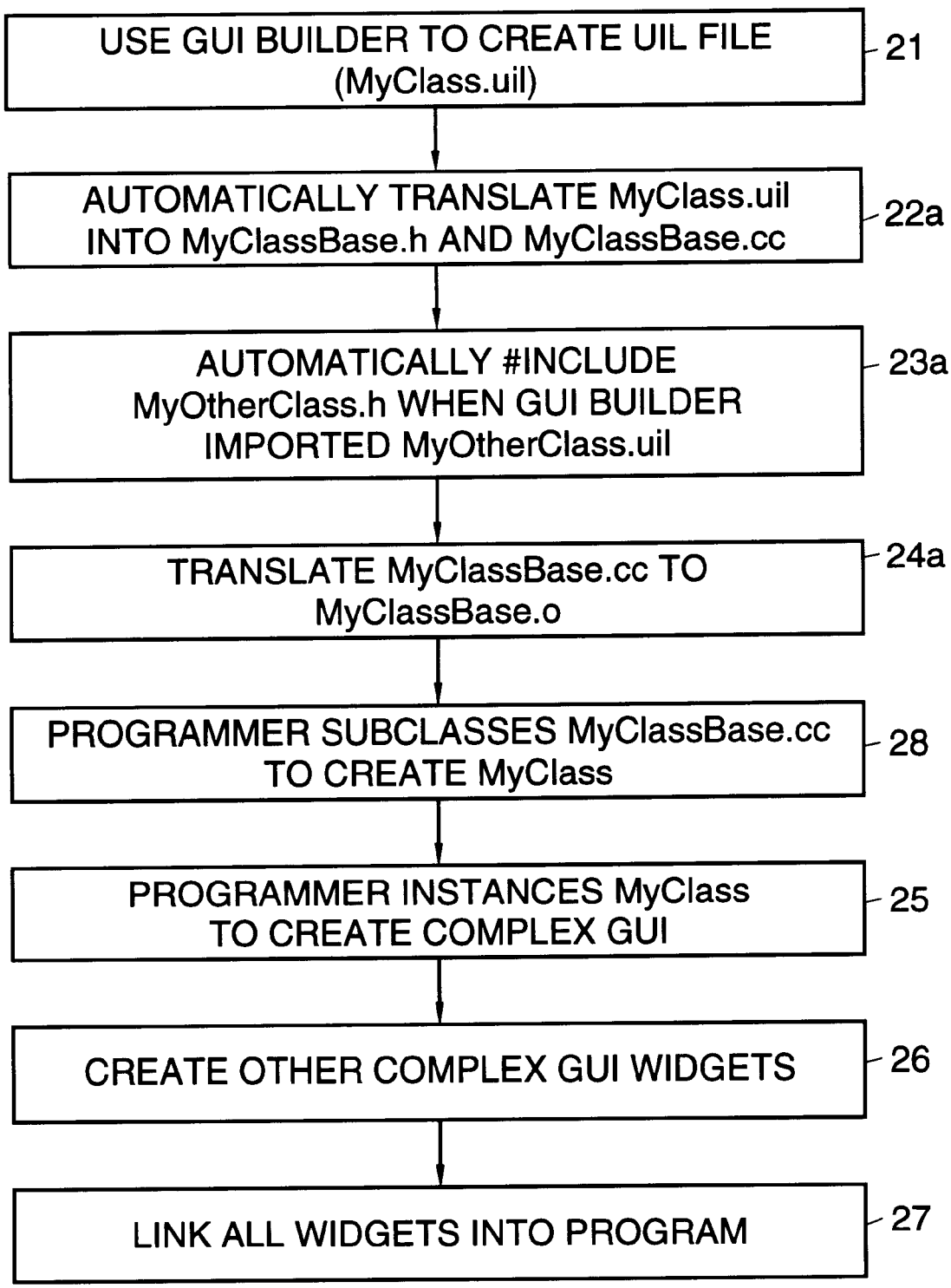

USER INTERFACE LANGUAGE TO CLASS LIBRARY COMPILER

BACKGROUND

The present invention is related generally to software compilers, and more particularly, to a software compiler that converts user interface language (UIL) files generated using any graphical user interface (GUI) builder into application transportable class library objects that may be used in any application framework.

The prior art displaced by the present invention is the current state of graphic user interface (GUI) builder code. A variety of user interfaces have been developed that conform to different user interface standards, such as Motif, OpenLook, CUA, New Wave, and Macintosh, for example. Each user interface is a set of rules and conventions by which a computer system communicates with a person operating with it. GUI builders are designed to generate code that implements a particular user interface.

GUI builders are discussed in a number of patents such as U.S. Pat. No. 5,495,567 entitled "Automatic Interface Layout Generator for Database Systems", U.S. Pat. No. 5,353,401 entitled "Automatic Interface Layout Generator for Database Systems", U.S. Pat. No. 5,335,320 entitled "Graphical User Interface Editing System", U.S. Pat. No. 5,384,911 entitled "Method of Transferring Programs from Action Oriented GUI Paradigm to Object Oriented GUI Paradigm", U.S. Pat. No. 5,297,250 entitled "Method of Generating Interfaces for use Applications that are Displayable on the Screen of a Data Processing System, and Apparatus for Performing the Method", U.S. Pat. No. 5,404,441 entitled "Method and Apparatus for Automatically Generating a Graphical User Interface Control Program", U.S. Pat. No. 5,327,529 entitled "Process of Designing User's Interfaces for Application Programs", and U.S. Pat. No. 5,347,629 entitled "Graphical User Interface Including Updating of Multiple Panels Using What You See is What You Get (WYSIWYG) Editor".

Some currently available GUI builders can import class libraries, but no tool exists that can interface alternative GUI builders with multiple class libraries. Current GUI builders only allow the use of their own framework and do not produce independent plug-in widgets. Widgets are blocks of code that define graphical objects or desktop icons comprising the user interface.

Heretofore, developers have chosen one of three methods to develop general user interface (GUI) builder code. The first method is to custom code a display screen using primitive graphics (implemented using Motif widgets, for example). The second method is to use a display class library that maps a Motif primitive layer in a higher level of abstraction, and which may be achieved using commercial products such as "views.h" available from Rouge Wave or a "Delphi MDISP library" available from the assignee of the present invention). The third method is to use a commercial GUI builder development tool such as Builder Xcessory available from Integrated Computer Solutions (ICS), for example.

All three methods have advantages and disadvantages, but the most common approaches are the second method (class library) or third method (GUI builder). The first method is very time consuming, but allows the most flexibility in screen functionality design.

Most displays do not need functions beyond a commonly used standard set, including buttons, lists, and sliders, and the like, and the class library or GUI builder methods are the most efficient in generating them. The GUI builder excels at constructing simple screens with the disadvantage that it generates code that must use products produced by the vendor of the GUI builder for development and maintenance. The class library method allows development of maintainable code but is more labor intensive.

Accordingly, it is an objective of the present invention to provide for an improved software compiler that converts user interface language (UIL) files generated using any graphical user interface (GUI) builder into application transportable class library objects that may be used in any application framework.

SUMMARY OF THE INVENTION

To meet the above and other objectives, the present invention provides for a software compiler tool and method that combines features of a class library and a graphical user interface (GUI) builder. The software compiler tool takes an intermediate file created in a user interface language that is generated by a GUI builder (a UIL file) and compiles it into readable code that uses class library objects, such as HCL objects (Hughes Class Library objects), for example. The tool creates complex widgets that can be plugged into any application framework.

Using the software compiler tool and method, a graphical user interface builder program is used to create a user interface language (UIL) file. The UIL file is automatically translated into C++, utilizing class libraries defined in a configuration file. For example, a system implemented in accordance with the present invention transforms a graphical user interface file generated by a graphical user interface builder into a transportable class library object. The system comprises a computer, an executable program that runs on the computer and which performs a compilation, and a resource file read by the program that tailors the compilation for any particular C++ class library.

More particularly, the software compiler tool and method reads module.uil code generated by the graphical user interface builder. A widget hierarchy is built corresponding to the widget hierarchy created by the graphical user interface builder. Argument values are loaded into widgets of the widget hierarchy. Resource settings are then generated for the widgets.

The method may also generate a module.h file containing an interface to the complex widget in C++, and then generate a module.cc file containing the implementation of the complex widget in C++ including resource settings. The method may also generate a module.rc file containing a Motif-style resource description for the complex widget. The complex widget may also include references to other complex widgets previously created using otherModule.uil code generated by the graphical user interface builder.

The method may automatically create references to C++ classes corresponding to otherModule.h and otherModule.cc that were generated by compiling other complex widgets previously created using otherModule.uil code generated by the graphical user interface builder. In the method, C++ base classes may also be generated that correspond to moduleBase.h and module.cc, and wrapper classes corresponding to module.h and module.cc may be created wherein additional non-graphical functionality is programmed into the program.

The UIL software compiler tool allows developers to use any GUI builder to produce easy-to-read, transportable code widgets that may be used in any application framework. This is in direct contrast to most GUI builders which force the use of their own framework and thus reduce flexibility and increase dependency on their product.

Also the code produced by the present software compiler tool is readable, and thus allows code maintenance without need for the GUI builder used to develop the underlying code, which reduces maintenance costs. Another benefit of the present software compiler tool is that the code may be easily customized, something that is impossible with code produced by conventionally available GUI builders.

The present software compiler tool may be used to produce code generated using any software that makes use of GUI class libraries. The software compiler tool combines the best features of the class library and the GUI builder methods. The software compiler tool produces code that is maintainable, and that can be produced very easily and fast using any commercially available GUI builder.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 illustrates the processing architecture of a software compiler in accordance with the principles of the present invention that converts user interface language (UIL) files generated using any general user interface (GUI) builder into application transportable class library objects that may be used in any application framework; and FIG. 2 illustrates processing details of a first embodiment of the present software compiler; and FIG. 3 illustrates processing details of a second embodiment of the present software compiler.

DETAILED DESCRIPTION

Referring to the drawing figures, FIG. 1 illustrates the processing architecture of a software compiler tool 10, method 10, or procedure 10 in accordance with the principles of the present invention. The software compiler tool 10 or method 10 converts user interface language (UIL) files 12 generated using any general user interface (GUI) builder 11 into application transportable class library objects 18 that may be used within different application frameworks. The present invention will be described with regard to its use with a specific GUI builder 11 known as "Builder Xcessory" available from Integrated Computer Solutions (ICS), but it is to be understood that it may be used with any available GUI builder 11 that can generate UIL code. The present software compiler tool 10 disclosed herein which is called HUH (Hughes Uil to Hcl converter) converts UIL files 12 generated by the Builder Accessory GUI builder (or other GUI builder) into class library objects 18, such as "MDISP" class library objects 18, for example, developed by the assignee of the present invention. MDISP class library objects 18, or similar objects, are well known to those skilled in the art.

Using the software compiler tool 10 or method 10, a graphical user interface builder 11 is used to create the user interface language (UIL) file 12. The UIL file 12 is automatically translated into C++, utilizing class library objects 18 defined in a configuration file. For example, a system corresponding to the tool 10 transforms the graphical user interface file generated by the graphical user interface builder 11 into a transportable class library object 18. The system 10 comprises a computer 19, an executable program 20 that runs on the computer 19 and which performs a compilation, and a resource file 17 read by the program 20 that tailors the compilation for any particular C++ class library.

The software compiler tool 10 or method 10 reads 13 the UIL file 12 (the module.uil code) generated by the graphical user interface builder 11. A widget hierarchy is built 14 corresponding to the widget hierarchy created by the graphical user interface builder 11. Argument values are loaded 15 into widgets of the widget hierarchy. Resource settings are then generated 16 for the widgets using data in the resource file 17.

As will be described in more detail below, the method 10 may also generate a module.h file containing an interface to the complex widget in C++, and then generate a module.cc file containing the implementation of the complex widget in C++ including resource settings. The method 10 may also generate a module.rc file containing a Motif-style resource description for the complex widget. The complex widget may also include references to other complex widgets previously created using otherModule.uil code generated by the graphical user interface builder 11.

The method 10 may automatically create references to C++ classes corresponding to otherModule.h and otherModule.cc that were generated by compiling other complex widgets previously created using otherModule.uil code generated by the graphical user interface builder 11. In the method 10, C++ base classes may also be generated that correspond to moduleBase.h and module.cc, and wrapper classes corresponding to module.h and module.cc may be created wherein additional non-graphical functionality is programmed into the program.

With reference to FIG. 2, it illustrates processing details of an embodiment of the software compiler tool 10. This embodiment of the software compiler tool 10 implements the following processing method 10 to create a program containing complex GUI widgets that uses class library objects 18. The graphical user interface builder 11 or program 11 is used to create 21 the user interface language (UIL) file 12, referred to as a MyClass.uil file 12. Other class files (MyOtherClass.uil) that have been previously created using the graphical user interface builder 11 may also be imported to create the UIL file 12. The software compiler tool 10 then automatically translates 22 the UIL file 12 into two files (MyClass.h and MyClass.cc). These two files correspond to header and source files, respectively, and which correspond to a C++ programming language representation of the UIL file 12.

The software compiler tool 10 automatically includes 23 (#Includes) an additional class file (MyOtherClass.h) in the translation performed in step 22 when the GUI builder 11 imported an additional UIL file 12 (MyOtherClass.uil). The MyClass.cc file is translated 24 into an object file (MyClass.o). A programmer then instances 25 MyClass to create a complex GUI widget. Optionally, other complex GUI widgets may be created 26 in the above manner. Finally, all complex GUI widgets are linked 27 into the program. The complex graphical user interface constructed in the above manner is used like any other class in the program to interact with a user. Callbacks contained within the linked program allow signals generated by the widgets in MyClass to tie directly to other objects in the program.

With reference to FIG. 3, it illustrates processing details of another embodiment of the software compiler tool 10. In this embodiment, the software compiler tool 10 implements the following processing method 10 to create a program containing complex GUI widgets that uses class library objects 18. As in the first embodiment, the graphical user interface builder 11 or program 11 is used to create 21 a user interface language (UIL) file 12 (MyClass.uil). The software compiler tool 10 automatically translates 22*a* the UIL file 12 into two files (MyClassBase.h and MyClassBase.cc) which correspond to header and source files. The software compiler tool 10 automatically includes 23*a* (#Includes) an additional class file (MyOtherClass.h) in the translation when the GUI builder 11 imported an additional UIL file 12 to create the MyClass.uil UIL file 12. The MyClassBase.cc file is translated 24*a* into an object file (MyClassBase.o). A programmer then subclasses 18 MyClassBase to create MyClass. The subclassing operation ties together various widgets to implement internal, non-graphical functionality. Callbacks are used internally for this purpose.

The programmer then instances 25 MyClass to create a complex GUI widget. Other complex GUI widgets may also be created 26 in the above manner. Finally, all complex GUI widgets are linked 27 into the program.

The software compiler tool 10 has been reduced to practice in an embodiment known to the assignee of the present invention as "HUH", or Hughes UIL to HCL converter, which is referred to hereinbelow as the HUH method 10 or UHU procedure 10. The present invention will be described in a manner that should be well understood to those skilled in the art of object code programming. The description of the present invention presumes a general understanding of object code programming and GUI code builders 11, and in particular the workings of the Builder Xcessory GUI builder 11.

The code translation that is performed by the software compiler tool 10 is as follows. The basic translation of a UIL file interface into an application transportable class library object proceeds as follows. The procedure 10 huh myfile.uil.

is run. This procedure reads "myfile.uil" and generates files "myfile.h" and "myfile.cc".

Top level widgets generated by the Builder Xcessory GUI builder 11, such as Application Shell, Top Level Shell, and Dialog Shell, for example, are not output to the UIL code file 12, except as comments that are formatted so that the Builder Accessory GUI builder 11 can see them. Directly below one of the top level shells is a single manager widget, such as a Form or Paned Window, for example. The manager widget represents the top level as far as the HUH procedure is concerned. For the purposes of this description, assume that the widget hierarchy of the UIL file 12 has been modeled in the Builder Xcessory GUI builder 11 is as follows:

```
Form myForm
|
+-> MenuBar menuBar
| |
| +-> CascadeButton cascadeButton "File"
| | |
| | +-> PulldownMenu pulldownMenu
| |  |
| |  +-> PushButton pushButton "New"
| |  +-> PushButton pushButton1 "Open"
| |  +-> PushButton pushButton2 "Close"
| |
| +-> CascadeButton cascadeButton1 "Edit"
| |  |
|    +-> PulldownMenu pulldownMenu1
```

-continued

```
|   |
|   |   +-> PushButton pushButton3 "Cut"
|   |   +-> PushButton pushButton4 "Copy"
|   |   +-> PushButton pushButton5 "Paste"
|   |
|   +-> RadioBox radioBox
|     |
|     +-> ToggleButton toggleButton "X"
|     +-> ToggleButton toggleButton1 "Y"
|     +-> ToggleButton toggleButton2 "Z"
|
+-> PushButton pushButton6 "Do it"
```

The HUH procedure generates the following .h file (including miscellaneous MDISP boilerplate such as DECLARE_CLASS, constructors, and assignment operators not shown here):

```
#include "DForm.h"
#include "DMenuBar.h"
#include "DPulldownMenu.h"
#include "DPushBtn.h"
#include "DRadioBox.h"
#include "DToggleBtn.h"
class MyForm: public DForm
{
public:
    virtual int create(const char *name,DWidget *parent,
            int manage=1);
    DMenuBar *menuBar;
    DPulldownMenu *cascadeButton;
      DPushBtn *pushButton;
      DPushBtn *pushButton1;
      DPushBtn *pushButton2;
    DPulldownMenu *cascadeButton1;
      DPushBtn *pushButton3;
      DPushBtn *pushButton4;
      DPushBtn *pushButton5;
    DRadioBox *radioBox;
      DToggleBtn *toggleButton;
      DToggleBtn *toggleButton1;
      DToggleBtn *toggleButton2;
    DPushBtn *pushButton6;
};
```

Indentation is automatically used to show the widget hierarchy. The widget class names match the names used in the MDISP library. The name of the top level widget in the hierarchy is made into a class name by capitalizing the first character.

The HUH procedure generates a corresponding .cc file (including MDISP boilerplate such as DEFINE_LOCAL_CLASS, and bodies of constructor functions not shown here):

```
#include "myfile.h"
int MyForm:: create(const char *name,DWidget *parent,int manage)
{
    if (!DForm:: create(name,parent,0)) return 0;
    menuBar = new DMenuBar;
    if (!menuBar->createMenuBar("menuBar",this,0,0,1)) return 0;
    menuBar->x(100);
    menuBar->y(100);
        . . .
    cascadeButton = new DPulldownMenu;
    if (!cascadeButton->createMenu("cascadeButton",menuBar))
       return 0;
    cascadeButton->attachment()->setLabelString("File");
        . . .
```

```
    pushButton = new DPushBtn;
    if (!pushButton->createPushButton
        ("pushButton",cascadeButton->menu(),0,0,1)) return 0;
      pushButton->setLabelString("New");
    if (manage)
      manageChild();
}
```

In the first part of the "create" function, the widget hierarchy is built. Then argument values are loaded into widgets.

The normal mode for the HUH procedure is to hard code settings for all resources. This means that any changes to the settings by the Builder Xcessory GUI builder 11 requires not only executing the HUH procedure 27, but also recompiling the generated ".cc" files.

Alternatively, resource files 17 may be used:

huh -rc myfile.uil

The ".h", ".cc", and ".rc" files are generated but the ".rc" file contains resource settings of the form:

MyForm*cascadeButton.labelString: File

MyForm*pushButton.labelString: New

. . .

MyForm*pushButton6.labelSTring: Do it

The ".cc" file no longer contains code to set these resources. Instead, the "create" function begins with the following call:

loadClassResources(name,parent,"MyForm");

The call to "loadClassResources" causes a resource database to be searched for all lines of code that begin with the class name, in this case, "MyForm". The appropriate actual resource lines with the proper widget hierarchy is generated on the fly for each instance of MyForm.

If the program is called "myAppl", a resource file 17 called "MyAppl" is checked. This file may simply include all of the ".rc" files for all of the Builder Xcessory-generated classes used in the application:

include "MyClass.rc"

include "MyOtherClass.rc"

. . .

Some resources cannot be set in a resource file 17. These include the "leftWidget", "rightWidget", "menuHelpWidget", and "pixmap", for example. It may also be desirable to have certain resources hard-coded. A configuration file loaded by the HUH procedure (described below) controls how these situations are handled.

When the HUH procedure is run, a new .rc file is generated although it is empty unless the -rc switch is used. New .h and cc files are only generated if they are different. Thus, a "makefile" contain rules for compiling the generated files as follows:

.INIT: file1.rc file2.rc . . .

%.rc: %.uil huh -rc $<.

That is, if the UIL file 12 changes, the .rc file is regenerated. By specifying all the .rc files in an .INIT rule, it is guaranteed that, if any UIL files 12 have changed, they are recompiled with the HUH procedure Then the rest of the "make" proceeds normally, checking the dates on the .h and .cc files which may or may not have been changed by the HUH procedure.

The HUH procedure depends on a resource file 17 called "Huh" which it located in either "./Huh", "~/Huh", or using the environment variable "HUH_OPTIONS". This file shows how various Motif names found in UIL files 12 map into the MDISP objects 18. Comments in this file are preceded by "#" and are self-explanatory.

Resources in this file allow a programmer to control what MDISP class and associated "create" function is indicated by a Motif class, control what MDISP member function is indicated by a Motif argument name, and control what MDISP enumerator name is indicated by a Motif argument value name. If a Motif argument value has multiple translations depending on the Motif class, this may also be specified. The programmer indicates what Motif arguments apply "→attachment()" or "→menu()" to MDISP objects 18 in order to access the underlying Motif widgets, indicates what MDISP include files must be #included by the generated C++ code in order to accommodate what MDISP classes will be indicated by what Motif classes, indicates which Motif top level widget classes don't have a good translation to MDISP, and indicates where Builder Xcessory generates redundant information.

The programmer can indicate what Motif arguments should not be included in the resource file 17, indicate what Motif arguments should be deferred until all children of the associated widget are created, indicate what Motif arguments should be deferred until all children of the associated widget are created and which are set on the children (i.e. attachments), indicate what Motif arguments cannot be set by an MDISP function call, and indicate what Motif arguments should not be applied if they have a null value.

The programmer can indicate which classes require the "createMenu" function, indicate the create function to be used when a certain dialog type is specified, indicate where MDISP combines two levels of Motif widgets into a single class, indicate widgets that are unmanaged by default, and indicate which shell managers are called out by specific HUH switches.

As specified in the Huh file, some widgets are created with delayed management to make them behave better. The widget is created unmanaged and then managed after argument functions have been called and children have been defined.

Some arguments cannot be set after widget creation. Some widgets behave better if the arguments are loaded at creation time rather than afterwards. One way to achieve this is to use resource files 17. Another way is to move the argument function calls to just before the call to the "create" function. This mode may be set with the following switch:

-preload

If this switch has been set as the default, it may be cleared with the following switch:

-aftload.

In either case, arguments that require the use of "→attachment" are always loaded after widget creation.

When Pixmaps occur in the UIL file 12, appropriate XPM-3 format ".xpm" files are generated to hold the various pixmaps. These files are only updated when the contents change.

It may be desirable to protect various sub-widgets of MyForm. The -prot switch inserts "protected:" after the create function and changes the name of the class to MyWidgetBase. In this case, the user should derive MyWidget from MyWidgetBase and then set up whatever member functions are desired to control access to the sub-widgets. It also appends "Base" to the names of the ".cc" and ".h" files.

Normally, it is the programmer's responsibility to create the topLevel widget, usually derived from DWindow to contain the complex widget that is generated. The "create- Display" function is overridden to allocate and create an instance of widgets. DWindow also installs callbacks and inserts code that causes MyWidgett to properly perform its function. For example:

```
class MyWidgetWindow: public DWindow
{
public:
  MyWidget *myWidget;
  MyWidgetWindow()
  {
    myWidget = new MyWidget;
  }
  virtual int createDisplay()
  {
    return myWidget->create("MyWidget",this);
  }
};
```

Alternatively, the HUH procedure 27 can generate this code if the -win or -pop switch is specified, in which case, the above example is generated as follows:

```
class MyForm: public DWindow // or DPopup
{
public:
    virtual int createDisplay();
    DForm *myForm
    MenuBar *menuBar;
     DPulldownMenu *cascadeButton;
       DPushBtn *pushButton;
       DPushBtn *pushButton1;
       DPushBtn *pushButton2;
     DPulldownMenu *cascadeButton1;
       DPushBtn *pushButton3;
       DPushBtn *pushButton4;
       DPushBtn *pushButton5;
     DRadioBox *radioBox;
       DToggleBtn *toggleButton;
       DToggleBtn *toggleButton1;
       DToggleBtn *toggleButton2;
     DPushBtn *pushButton6;
};
```

The classname (MyForm) is applied to the DWindow rather than to the DForm.

Builder Xcessory provides the ability to create and use classes within the context of some other widget hierarchy. It does this by using naming conventions and special directives in the UIL code which are commented out by "!(BX)" or "!(CX)". If the "-bx-" switch is not set, The HUH procedure 27 reads past this kind of comment and interpret the special directives.

In Builder Xcessory, a class may be created as an independent widget hierarchy. An icon for the class then appears on a user pallet and may be instanced just as any other widget. If desired, this class may reside in a separate UIL file 12, in which case, The HUH procedure 27 assumes that that a separate UIL file 12 has been compiled and inputs #include's to the .h files generated by that compilation.

In "Instance" mode, Builder Xcessory allows a widget hierarchy to begin with an ApplicationShell. This shell should be appropriately named because a class based on DWindow is generated with this name, capitalizing the first character of the name. That is, if the hierarchy is as follows:

```
ApplicationShell myAppl
|
+-> Form myForm
    |
    +-> MenuBar menuBar
    ||
    | +-> CascadeButton cascadeButton "File"
    . . .
``` and the C++ class is generated as follows:

```
class MyAppl: public DWindow
{
public:
   virtual int createDisplay();
   DForm *myForm;
    DMenuBar *menuBar;
     DPulldownMenu *cascadeButton;
         . . .
```

Builder Xcessory allows import of classes defined in external UIL files 12. The main UIL file 12 contains directives such as:

include file 'directory/filename.uil' include file "directory/filename.uil"

and if that file contains any "object" definitions, it assumes that a corresponding 'directory/filename.h' file exists to define any classes contained in the UIL file 12.

The "-I" switch may be used to indicate a directory to search if "filename.uil" does not have an explicit directory and is not found in the current directory:

huh -Idirectory1-Idirectory2 . . .

One directory may be specified per "-I". Up to 16 "-I" may be specified in any given run.

Builder Xcessory uses a naming convention such that objects representing widgets internal to a class have names that are prefixed by the class name. A UIL object which has no direct references and which has a name beginning with an uppercase character (i.e. "Classname") indicates a Builder Xcessory class. Widgets defined internal to that class have its Builder Xcessory name prefixed by "classname__" (first character lowercase). If in Builder Xcessory, an instance of some other class occurs inside of this class, the HUH procedure 27 knows this by recognizing control names that begin with a different prefix. For example:

object A . . . { controls { . . . a_form1; . . . }};

object a_form1 . . . { controls { . . . b_button1; . . . }};

translates to:

class A { . . . B *form1; . . . };, for example.

If "receptors" are used by Builder Xcessory to implement inheritance, two different prefixes occur in the controls. If one of the prefixes in the controls matches the prefix on the object or corresponds to a capitalized class name used as the object name, it indicates that the user had instanced another class but added to it. For example:

object B . . . { controls { . . . a_form; XmName b_form; }};

translates to:

class B: . . . A { . . . DName *form; };

If a new class is created from an old one nothing is added, and the HUH procedure 27 looks past comments having the form:

!(BX) BxNclass. . . ="Classname"
to find the actual class names involved.

Builder Xcessory allows one widget in a class to be specified as a "receptor". That is, any widgets that are added in the derived class are created as children of the receptor widget.

A given resource of a class may be flagged as "Exposed". Anywhere that class is instanced, alternate values may be set for any exposed resources.

If an exposed resource is normally set with a function called "resourceName" and the widget is called "myWidget", the following public member function is generated in the header file:

int myWidgetResourceName(type arg)
    { return myWidget→resourceName(arg); }

If an exposed resource is normally set with a function called "setResourceName" and the widget is called "myWidget", the following member function is generated in the header file:

int setMyWidgetResourceName(type arg)
    { return myWidget→setResourceName(arg); }

When a Dialog Shell is created in Builder Xcessory and it is made a member of one class or widget hierarchy, Builder Xcessory puts the information about the dialog shell in its comments. The HUH procedure 27 reads past the comments to find the connection between a dialog box and its parent widget. Dialog shells may be made to pop up by calling "manageChild" on the widget directly under the dialog shell widget.

A top level shell widget occurring in the middle of some other hierarchy is translated to DWindow but is created with the "createTopLevelShell" function to attach it to the hierarchy. The DWindow "show" or "hide" functions are called to make these windows visible or invisible.

If it is specified in Builder Xcessory that classes are to be read in, the UIL file 12 contains "include" directives. If those files in turn include other files, Builder Xcessory generates in the comments, although it should have placed it in the UIL code:

!(BX) read_include file 'filename'

The HUH procedure reads past the comment and treats it like a regular include.

The following switches are available in the HUH procedure 27:

-aftload
which sets most arguments just after widget creation. This is the default but it may be changed by -preload;

-bx
causes the given widget names to be used;

-Ipath
looks for include files in the directory specified by "path";

-pop
generates a DPopup shell;

-preload
sets most arguments before widget creation rather than after;

-prot
generates protected classes;

-rc
generate a resource file 17 ("myfile.rc"). This removes the hard-coding of most arguments from the cc file. The .rc file is always generated but it is empty if the -rc switch is not set; and -win
generates a DWindow shell.

Switches are set to on by default by setting the following environment variable:

setenv HUH_DEFAULTS -Ipath1 -Ipath2 -rc . . .

Improvements to MDISP that support the present invention have been made. The improvements allow parameters to be set before creation of a widget. Arguments are set in DWidgets without having to first perform a "create". If a "create" has not been done, arguments are buffered and then loaded at creation time. If argument lists are supplied by routines such as "createPushButton", for example, these lists are merged with any buffered arguments.

This was implemented because some widgets behave better when pre-loaded or when set in a resource file 17. However, the MDISP improvement existing allows preloading by stepping outside of the member function syntax using Motif style "XtArg" lists.

One potential problem with "preloading" is that a class might preload arguments that are superseded when the class is instanced. This problem was solved by having the "preload" check for arguments already having been included in the list and discarding duplicates. Thus a user-defined class can be preloaded while achieving the correct behavior.

There are some things that cannot be set after creation, including "items" and "itemCount". Preloading now allows these parameter functions to be called.

A new string converter is registered with Motif when DAppl or DApplShell creates are performed. This allows compound strings to be represented by an ordinary resource string using the following syntax:

::[#tag][:t][:r]["str"]

where:

::=indicates compound string.

tag=the font tag

:t=separator (if not seen no separator added to segment)

:r=right to left (if not seen left to right assumed)

"str"=the text of the string.

The components for the compound string can be repeated any number of times.

There is also a converter for XPM format pixmaps. This has been implemented in DXIcon so the following expression can be used:

DXIcon myIcon(xpm-array);

and then, for example:

```
myWidget->backgroundPixmap(myIcon);
XPM format is something like:
/* XPM */
static char *name[] = {
"16 16 2 1",
".c#000",
"X c #ffffffffffff",
"....XXXX....XXXX",
"....XXXX....XXXX",
"....XXXX....XXXX",
"....XXXX....XXXX",
"XXXX....XXXX....",
"XXXX....XXXX....",
"XXXX....XXXX....",
"XXXX....XXXX....",
"....XXXX....XXXX",
"....XXXX....XXXX",
"....XXXX....XXXX",
"....XXXX....XXXX",
"XXXX....XXXX....",
"XXXX....XXXX....",
"XXXX....XXXX....",
"XXXX....XXXX....",
};
``` where:

The first string in the array is:

"width height colors characters indicating:

width—Number of pixels across the pixmap height—Number of rows in the pixmap colors—Number of color definitions characters—Number of characters per pixel The next <colors> strings indicate color definitions:

"x c color"

where:

x—<characters> representing a color color—A color name such as White

—A color value such as #fff

The next height strings of length width*characters contain character codes for each pixel in the pixmap.

When a DXIcon is referenced for the first time in a "pixmap" argument function, a conversion operator causes a Pixmap to be generated. These conversions are defined in "DConvert". A global symbol "dApplShell" is also defined there and is set by "DAppl" and "DApplShell" to be the display widget. This avoids the need to have a Widget passed as a parameter to the various conversion functions for reference purposes.

There was no direct provision in Motif to have resource files 17 that could handle classes. This has been remedied by the following function in "DWidget.h":

loadClassResources("name",parent,"cname");

This is called just before a "create" function to indicate that the widget that is created with "name" and <parent> belongs to class "cname". This causes resource file 17 lines of the form:

cname.resource: value or cname*item.resource: value to be applied to the complex widget that is created.

When creating a complex class called "MyClass", a "MyClass.h" and "MyClass.cc" are usually created. In addition, a "MyClass.rc" may be created to set resources relative to the class as indicated above.

If a program is called "myAppl", a resource file 17 called "MyAppl" is checked. This file may include all of the complex class resource files 17 used in the application:

include "MyClass.rc"

include "MyOtherClass.rc"

. . .

The "create" function has been changed from two arguments to three:

create("name",parent,managed=1)

where the third argument indicates whether the widget is managed (default True). This change will not affect any normal uses of "create" but may affect complex classes which override "create".

DLabel has a two argument "setLabelString" (with the second argument having a default). DDate, DDateTime had one argument "setLabelString". All other "set . . . LabelString" functions had one argument. There was also a need to have a "setLabelString" in DWidget to handle several unaccounted-for cases. Since merely moving "setLabelString" to DWidget caused a conflict with the one argument versions in DDate and DDateTime, those were also changed to two argument (with the second defaulted). All other "set . . . LabelString functions were likewise changed to the two argument form. If the second argument is default, the new converter in DConvert is invoked (via "setString" in DWidget) to enable a more sophisticated compound string capability (as described above).

A new set of functions has been added to support callbacks to member functions of arbitrary classes. Wherever a function such as "myname" exists to receive a callback such as "XmNmynameCallback", there is now a function called "mynameCb" which may be called as follows:

mynameCb(function)

which calls a global "function(Dwidget*,XtPointer)" in response to the signal represented by "myname" or:

mynameCb(pointer,classname::function)

which calls "pointer→function(DWidget*,XtPointer)" in response to the signal represented by "myname".

Thus, a software compiler that converts user interface language (UIL) files generated using any general user interface (GUI) builder into application transportable class library objects that may be used in any application framework has been disclosed. It is to be understood that the described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A computer implemented method of transforming a user interface language (UIL) file containing a complex widget generated by any of a plurality of graphical user interface builders into an application transportable C++ class utilizing a class library, comprising:

creating a user interface language (UIL) file containing a complex widget hierarchy from any of a plurality of graphical user interface builders;

translating the UIL file into two files corresponding to a My Class.k file and a My Class.cc file, the My Class.k file containing complex widgets and the My Class.cc file containing label widgets, said files translated into a C++ programming language representation of the UIL file;

translating the My Class.cc file into an object file;

creating from the object file a module.uil code containing a complex graphic user interface (GUI) widget;

reading module.uil code generated by any of the plurality of graphical user interface builders;

building a widget hierarchy corresponding to the widget hierarchy created by the read graphical user interface builder;

loading argument values into widgets of the widget hierarchy;

retrieving from a user programmed resource file data for tailoring the transformation for any C++ class library; and generating resource settings from the retrieved resource file data for the widgets loaded with argument values for any particular C++ class library for use within different application frameworks.

2. The method of claim 1 further comprising referencing other complex widgets previously created using otherModule.uil code generated by any of a plurality of graphical user interface builders.

3. The method of claim 1 further comprising:

generating C++ base classes corresponding to moduleBase.h and module.cc; and creating wrapper classes corresponding to module.h and module.cc wherein additional non-graphical functionality is programmed into the program.

4. A system for transforming a graphical user interface file generated by any of a plurality of graphical user interface builders into a transportable class library object, comprising:

a computer;

an executable program that runs on the computer to perform a compilation;

a resource file programmed by a user and read by the program that tailors the compilation for any particular C++ class library; and said program comprising:

creating a user interface language (UIL) file containing a complex widget hierarchy from any of a plurality of graphical user interface builders;

translating the UIL file into two files corresponding to a My Class.k file and a My Class.cc file, the My Class.k file containing complex widgets and the My Class.cc file containing label widgets, said files translated into a C++ programming language representation of the UIL file;

translating the My Class.cc file into an object file;

creating from the object file a module.uil code containing a complex graphic user interface (GUI) widget;

reading module.uil code generated by any of the plurality of graphical user interface builders;

building a widget hierarchy corresponding to the widget hierarchy created by the read graphical user interface builder;

loading argument values into widgets of the widget hierarchy;

retrieving from a user programmed resource file data for tailoring the transformation for any C++ class library; and generating resource settings from the retrieved resource file data for the widgets loaded with argument values for any particular C++ class library for use within different application frameworks.

5. A computer implemented method of transforming a user interface language (UIL) file containing a complex widget generated by any of a plurality of graphical user interface builders into an application transportable C++ class utilizing a class library, comprising:

creating a user interface language (UIL) file containing a complex widget hierarchy from any of a plurality of graphical user interface builders;

translating the UIL file into two files corresponding to a My Class.k file and a My Class.cc file, the My Class.k file containing complex widgets and the My Class.cc file containing label widgets, said files translated into a C++ programming language representation of the UIL file;

translating the My Class.cc file into an object file;

creating from the object file a module.uil code containing a complex graphic user interface (GUI) widget;

reading module.uil code generated by one of the plurality of graphical user interface builders;

building a widget hierarchy corresponding to the widget hierarchy created by the read graphical user interface builder;

loading argument values into widgets of the widget hierarchy;

retrieving from a user programmed resource file data for tailoring the transformation for any C++ class library;

generating resource settings from the retrieved source file data for the widgets;

generating a module.h file containing an interface to the complex widget C++; and generating a module.cc file containing the implementation of the complex widget in C++ including resource settings.

6. The method of claim 5 further comprising:

generating a module.rc file containing a Motif-style resource description for the complex widget.

7. The method of claim 5 further comprising references to other complex widgets previously created using otherModule.uil code generated by the graphical user interface builder.

8. The method of claim 5 further comprising:

automatically creating references to C++ classes corresponding to otherModule.h and otherModule.cc which were generated by compiling other complex widgets previously created using otherModule.uil code generated by the graphical user interface builder.

9. The method of claim 5 further comprising:

generating C++ base classes corresponding to module.Base.h and module.cc;

creating wrapper classes corresponding to module.h and module.cc wherein additional non-graphical functionality is programmed into the program.

* * * * *